United States Patent
Huang (10) Patent No.: US 9,460,528 B2
(45) Date of Patent: Oct. 4, 2016

(54) METHOD FOR COLLOCATING CLOTHING ACCESSORIES ON HUMAN BODY

(71) Applicant: Teknowledge Development corp., Taipei (TW)

(72) Inventor: Chung-Jen Huang, Taipei (TW)

(73) Assignee: Teknowledge Development corp., Taipei (TW)

( * ) Notice: Subject to any disclaimer, the term of this patent is extended or adjusted under 35 U.S.C. 154(b) by 88 days.

(21) Appl. No.: 14/506,702

(22) Filed: Oct. 6, 2014

(65) Prior Publication Data

US 2015/0097859 A1    Apr. 9, 2015

(30) Foreign Application Priority Data

Oct. 7, 2013    (TW) .............................. 102136239 A (51) Int. Cl.
   *G06T 11/60*    (2006.01)
   *G06T 11/00*    (2006.01)

(52) U.S. Cl.
   CPC ............ *G06T 11/00* (2013.01); *G06T 2210/16* (2013.01)

(58) Field of Classification Search
   CPC ........................... G06T 11/00; G06T 2210/16
   USPC ....................................................... 345/632
   See application file for complete search history.

(56) References Cited

U.S. PATENT DOCUMENTS

2013/0235078 A1*    9/2013   Takahashi ............... G06T 11/00
                                                            345/633

FOREIGN PATENT DOCUMENTS

| CN | 102945530 | 2/2013 | |
|---|---|---|---|
| FR | WO 2012123346 A2 * | 9/2012 | ............. G06T 17/00 |
| JP | 2011198112 | 10/2011 | |
| JP | 2013037445 | 2/2013 | |
| JP | 2013101529 | 5/2013 | |
| JP | 2013190974 | 9/2013 | |
| WO | 2012123346 | 9/2012 | |

OTHER PUBLICATIONS

"Office Action of Japanese Counterpart Application", issued on Aug. 28, 2015, p. 1-p. 4.
"Office Action of Taiwan Counterpart Application", issued on Nov. 24, 2014, p. 1-p. 8.

* cited by examiner

*Primary Examiner* — Gregory J Tryder
*Assistant Examiner* — Yuehan Wang
(74) *Attorney, Agent, or Firm* — Jianq Chyun IP Office (57) ABSTRACT

A method for collocating a clothing accessory on a human body for an electronic apparatus, is provided. A human body picture is shown on a display unit, and a human body description file corresponding to a human body model included in the human body picture is obtained from a database. A clothing accessory picture is obtained from another database based on a user choice, and a clothing accessory description file corresponding to a clothing accessory model included in the clothing accessory picture. The object picture is superposed on the human body picture automatically according to the human body and the object description files.

10 Claims, 5 Drawing Sheets

METHOD FOR COLLOCATING CLOTHING ACCESSORIES ON HUMAN BODY

CROSS-REFERENCE TO RELATED APPLICATION

This application claims the priority benefit of Taiwan application serial no. 102136239, filed on Oct. 7, 2013. The entirety of the above-mentioned patent application is hereby incorporated by reference herein and made a part of this specification.

BACKGROUND OF THE INVENTION

1. Field of the Invention

The invention relates to a method for collocating clothes, and particularly relates to a method for collocating a clothing accessory on a human body by using image processing.

2. Description of Related Art

Various clothes in different styles constantly hit the market. People are thus free to match clothes to cope with styles for different occasions, weather, or needs. However, it is not only time-consuming but troublesome to try on clothes one after another, and clothes previously matched may be forgotten after trying many different clothes, making the previously devoted time and attention a complete waste.

SUMMARY OF THE INVENTION

The invention provides a method for collocating a clothing accessory on a human body, where an electronic apparatus is used to automatically execute the collocation of the clothing accessory.

A method for collocating a clothing accessory on a human body is adapted for an electronic apparatus. The method includes: displaying a human body picture on a display unit, and obtaining a human body description file corresponding to a human body model included in the picture from a first database, wherein the human body description file includes a human body coordinate matrix based on a plurality of axes; based on a user choice, obtaining a clothing accessory picture from a second database, and obtaining a clothing accessory description file corresponding to a clothing accessory model included in the clothing accessory picture, wherein the clothing accessory description file includes a clothing accessory coordinate matrix based on the axes; and based on the human body coordinate matrix and the clothing accessory coordinate matrix, automatically superposing the clothing accessory picture on the human body picture.

According to an embodiment of the invention, after automatically superposing the clothing accessory picture on the human body picture, a size of the clothing accessory picture is adjusted based on the human body coordinate matrix and the clothing accessory coordinate matrix.

According to an embodiment of the invention, after automatically superposing the clothing accessory picture on the human body picture, the clothing accessory picture is rotated and corrected based on angle information of the human body description file and based on angle information of the clothing accessory description file. The angle information of the human body description file records angles between the axes in the human body model, and the second angle information of the clothing accessory description file records angles between the axes in the clothing accessory model.

According to an embodiment of the invention, the clothing accessory picture has a corresponding clothing accessory information file that includes a type of material used. After automatically superposing the clothing accessory picture on the human body picture, a further comparison is made as to whether a clothing accessory size from the clothing accessory model matches a body size of the human body model. In addition, under the circumstance that the recorded the type of the material is flexible, if the clothing accessory size is smaller than the body size, the clothing accessory picture is enlarged within a flexible size range of the type of the material to match the body size with the clothing accessory size.

According to an embodiment of the invention, the axes include a spine axis, a shoulder axis, a waist axis, a buttocks axis, an upper arm axis, a lower arm axis, a thigh axis, and a calf axis.

According to an embodiment of the invention, the method further includes the process of building the human body description files, including these steps: receiving the human body picture having the human body model, building the axes of the human body model, and obtaining the human body coordinate matrix based on the axes. Then, the human body description file is stored in the first database.

According to an embodiment of the invention, the method further includes the process of building the clothing accessory description file, including these steps: receiving the clothing accessory picture having the clothing accessory model, building the axes of the clothing accessory model, and obtaining the clothing accessory coordinate matrix based on the axes. Then, the clothing accessory description file is stored in the second database.

According to an embodiment of the invention, after automatically superposing the clothing accessory picture on the human body picture, whether a new clothing accessory picture is obtained from the second database is determined. In addition, the new clothing accessory picture includes a new clothing accessory model. If the new clothing accessory picture is obtained from the second database, the new clothing accessory picture is automatically superposed on the human body picture according to the human body coordinate matrix and a clothing accessory coordinate matrix of the new clothing accessory picture, and the superposed pictures are shown on the display unit.

According to an embodiment of the invention, after determining whether the new clothing accessory picture was obtained from the second database, if a new clothing accessory picture was not obtained from the second database, a superposed picture is generated and stored.

According to an embodiment of the invention, the method further includes: when receiving a new human body picture, obtaining a human body coordinate matrix corresponding to the new human body picture by adjusting the existing human body coordinate matrix in the first database; and when receiving a new clothing accessory picture, obtaining a clothing accessory coordinate matrix corresponding to the new clothing accessory picture by adjusting the existing clothing accessory coordinate matrix in the second database.

According to an embodiment of the invention, the method further includes: providing an operating interface in the display unit; importing the human body picture into the operating interface for display; choosing the clothing accessory picture from the second database through the operating interface; and after automatically superposing the clothing accessory picture on the human body picture, displaying an outcome through the operating interface.

Based on the preceding, by building the corresponding description files for the human body picture and the clothing accessory picture, the electronic apparatus may be used to perform automatic superposition, making its use more convenient.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
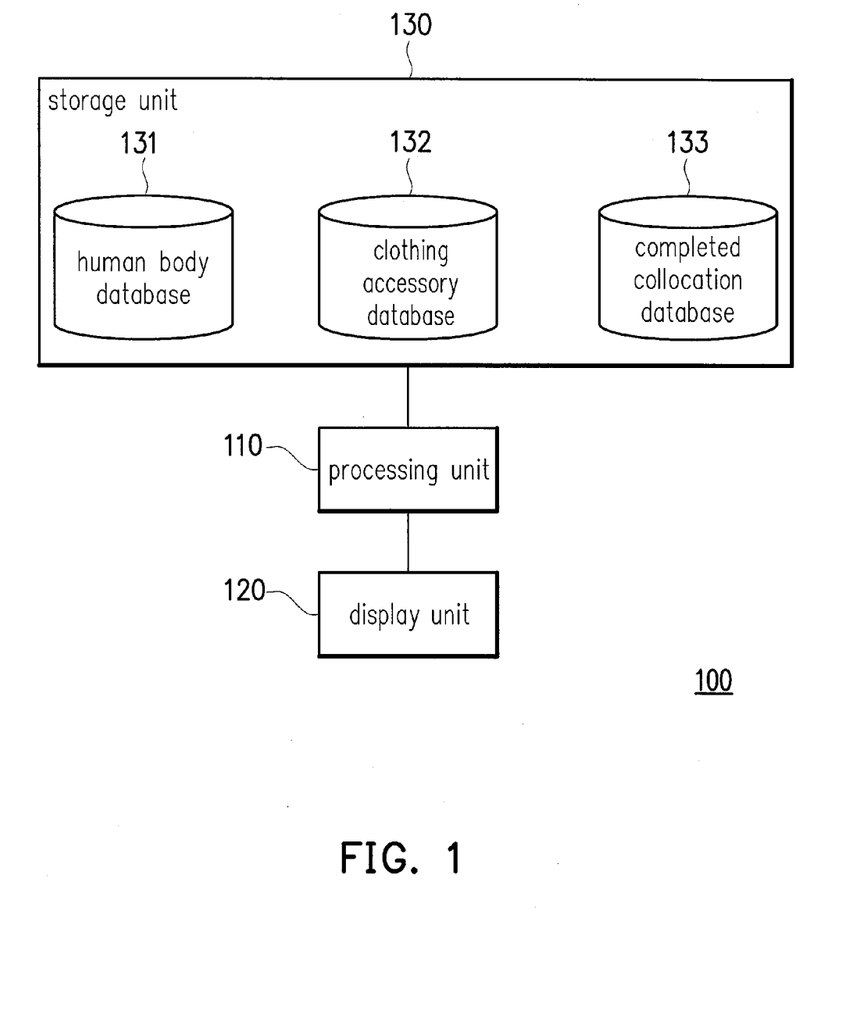
FIG. 1 is a block diagram illustrating an electronic apparatus according to an embodiment of the invention.

FIG. 1 is a block diagram illustrating an electronic apparatus according to an embodiment of the invention. Referring to FIG. 1, an electronic apparatus 100 includes a processing unit 110, a display unit 120, and a storage unit 130. The processing unit 110 is coupled to the display unit 120 and the storage unit 130.

The processing unit 110 is a device such as a central processing unit (CPU), a graphic processing unit (GPU), or other programmable microprocessors. In addition, the processing unit 110 is configured to execute hardware, software, and data instructions in operational software in the electronic apparatus 100.

The display unit 120 is a cathode ray tube (CRT) display, a liquid crystal display (LCD), a plasma display, a touch display, etc.

The storage unit 130 is a fixed or removable random access memory (RAM), read-only memory (ROM), flash memory, hard disk of any type, or other similar apparatuses or the combination thereof. In this embodiment, code segments that may be executed by the processing unit 110 are recorded in the storage unit 130. After the code segments are installed, the processing unit 110 is configured to execute the code segments. The code segments include a plurality of commands. The processing unit 110 uses the commands to execute a plurality of steps in a method for collocating clothing accessories on a human body. In this embodiment, the electronic apparatus 100 only includes one processing unit 110. However, in other embodiments, the electronic apparatus 100 may also include a plurality of processing units, and the processing units are configured to execute the installed code segments.

The storage unit 130 includes a human body database (first database) 131, a clothing accessory database (second database) 132, and a completed collocation database 133. The human body database 131 is configured to store human body pictures having human body models, and a human body description file corresponding to each of the human body models. In the human body description file, a human body coordinate matrix based on a plurality of axes defined in advance is recorded. The human body coordinate matrix is configured as the basis of automatic superposition with a clothing accessory picture. The processing unit 110 may build the human body description file corresponding to the human body model in advance. For example, the processing unit 110 may receive in advance a human body picture having the human body model, build the plurality of axes of the human body model based on a predetermined definition, and then obtain the human body coordinate matrix based on the axes. Finally, the processing unit 110 stores the human body picture and the corresponding human body description file to the human body database 131.

Figure 2:
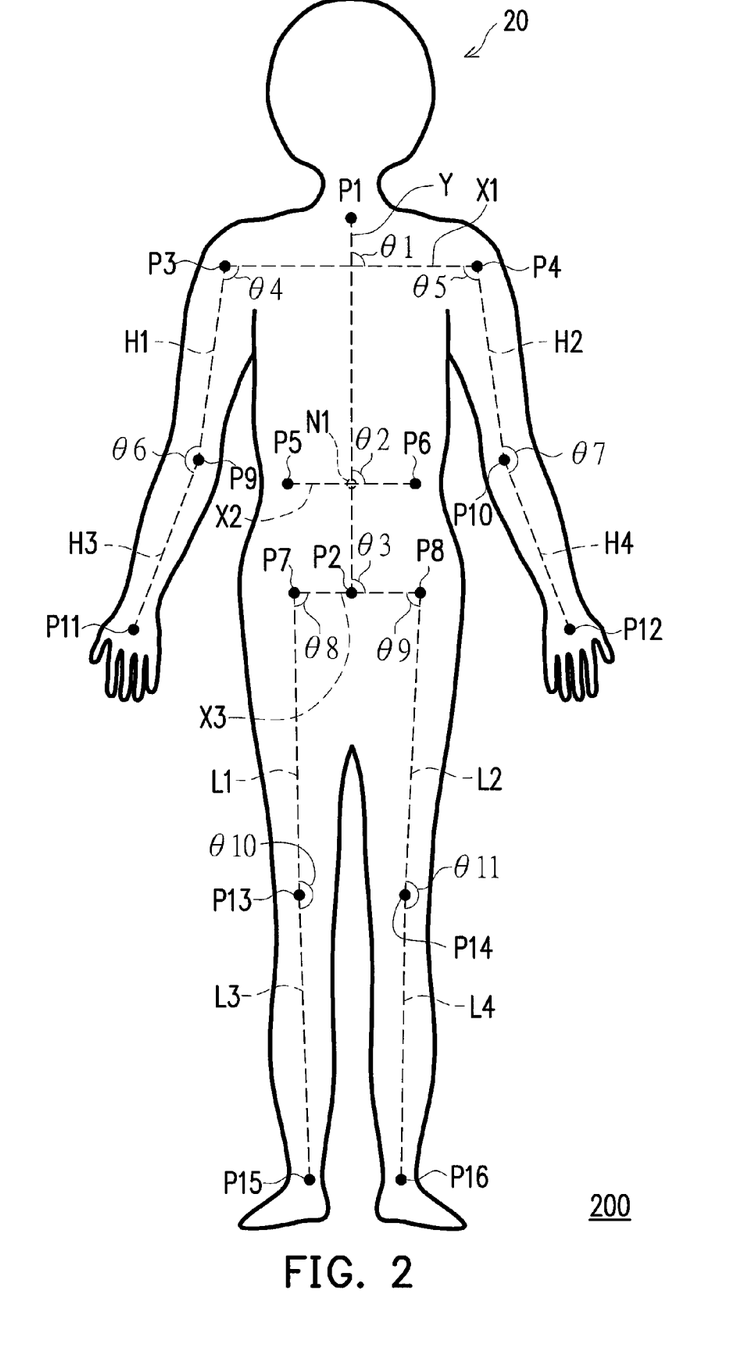
FIG. 2 is a schematic view illustrating axes of the human body according to an embodiment of the invention.

For example, FIG. 2 is a schematic view illustrating axes of the human body according to an embodiment of the invention. In this embodiment, the axes include a spine axis, a shoulder axis, a waist axis, a buttocks axis, left and right upper arm axes, left and right lower arm axes, left and right thigh axes, and left and right calf axes. However, in other embodiments, the number of axes may be increased or decreased based on the user's needs, and the number and positions of the axes are not limited thereto.

Referring to FIG. 2, a human body picture 200 includes a human body model 20 having a spine axis Y, a shoulder axis X1, a waist axis X2, a buttocks axis X3, a right upper arm axis H1, a left upper arm axis H2, a right lower arm axis H3, a left lower arm axis H4, a right thigh axis L1, a left thigh axis L2, a right calf axis L3, and a left calf axis L4. Accordingly, a human body coordinate matrix {Y, X1, X2, X3, H1, H2, H3, H4, L1, L2, L3, L4} includes coordinates of a plurality of control points in each of the axes, as detailed in the following: spine Y: {P1, ..., P2}, shoulder axis X1: {P3, ..., P4}, waist axis X2: {P5, ..., P6}, buttocks axis X3: {P7, ..., P8}, right upper arm axis H1: {P3, ..., P9}, left upper arm H2: {P4, ..., P10}, right lower arm axis H3: {P9, ..., P11}, left lower arm axis H4: {P10, ..., P12}, right thigh axis L1: {P7, ..., P13}, left thigh axis L2: {P8, ..., P14}, right calf axis L3: {P13, ..., P15}, left calf axis L4: {P14, ..., P16}. In the above description, only the first and last control points are described, while the plurality of control points sampled in between are omitted. In other words, each human body axis includes the coordinates of the two control points and the plurality of control points in between.

In addition, angle information (angle information of the human body description file) {θ1 to θ11}, namely included angles between the axes, is also recorded in the human body description file. Taking FIG. 2 as an example, an included angle between the spine axis Y and the shoulder axis X1 is θ1, an included angle between the spine axis Y and the waist axis X2 is θ2, an included angle between the spine axis Y and the buttocks axis X3 is θ3, an included angle between the shoulder axis X1 and the right upper arm axis H1 is θ4, an included angle between the shoulder axis X1 and the left upper arm axis H2 is θ5, an included angle between the right upper arm axis H1 and the right lower arm axis H3 is θ6, an included angle between the left upper arm axis H2 and the left lower arm axis H4 is θ7, an included angle between the buttocks axis X3 and the right thigh axis L1 is θ8, an included angle between the buttocks axis X3 and the left thigh axis L2 is θ9, an included angle between the right thigh axis L1 and the right calf axis L3 is θ10, and an included angle between the left thigh axis L2 and the left calf axis L4 is θ11.

Back to FIG. 1, the clothing accessory database 132 is configured to store clothing accessory pictures having clothing accessory models and a clothing accessory description file of each of the clothing accessory models. In the clothing accessory description file, a clothing accessory coordinate matrix based on the axes defined in advance is recorded. The clothing accessory coordinate matrix is configured as the basis for automatic superposition on the human body picture, and the processing unit 110 also builds in advance the clothing accessory description file corresponding to the clothing accessory model. For example, the processing unit 110 may receive in advance the clothing accessory picture having the clothing accessory model. Then, axes of the clothing accessory model are built, and the clothing accessory coordinate matrix is obtained based on the axes. Then, the processing unit 110 stores the clothing accessory picture and the corresponding clothing accessory description file in the clothing accessory database 132. Similar to the human body coordinate matrix, the clothing accessory coordinate matrix also has a plurality of coordinates of the spine axis Y, the shoulder axis X1, the waist axis X2, the buttocks axis X3, the right upper arm axis H1, the left upper arm axis H2, the right lower arm axis H3, the left lower arm axis H4, the right thigh axis L1, the left thigh axis L2, the right calf axis L3, and the left calf axis L4. Moreover, the clothing accessory description file also includes angle information (angle information of the clothing accessory description file) recording the included angles between the axes.

As clothing accessory categories of the clothing accessory models differ, some values of the axes may be set to zero. For example, if a clothing accessory is categorized as an upper body accessory, values of the right thigh axis L1, the left thigh axis L2, right calf axis L3, and the left calf axis L4 are set to zero. If a clothing accessory is categorized as a lower body accessory, values of the right upper arm axis H1, the left upper arm axis H2, the right lower arm axis H3, and the left lower arm axis H4 are set to zero.

Regarding the completed collocation database 133 in the storage unit 130, this database is configured to store a superposed picture generated after clothing accessory collocation is completed.

Figure 3:
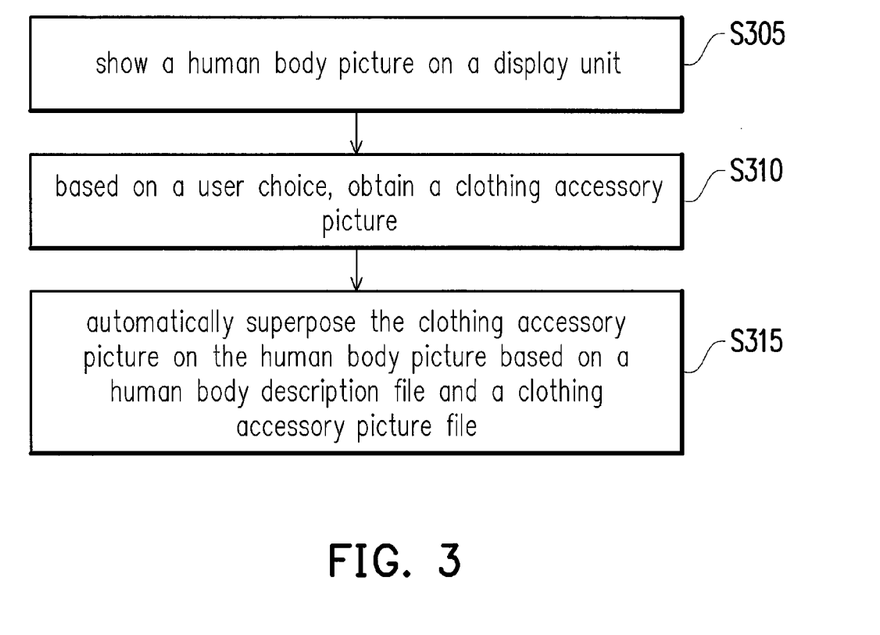
FIG. 3 is a flowchart illustrating a method for collocating clothing accessories on a human body according to an embodiment of the invention.

In the following, a method for collocating clothing accessories on a human body is described with reference to the electronic apparatus 100. FIG. 3 is a flowchart illustrating a method for collocating clothing accessories on a human body according to an embodiment of the invention. Referring to FIGS. 1 and 3 together, at Step S305, the human body picture is shown on display unit 120, and the corresponding human body description file is obtained from the human body database 131. Each human body picture includes a human body model, and each human body model is built with a human body description file in advance and stored in the human body database 131. Therefore, when the processing unit 110 obtains one of the human body pictures from the human body database 131, the processing unit 110 also obtains the corresponding human body description file.

Then, at Step S310, based on a user choice, the processing unit 110 obtains the clothing accessory picture from the clothing accessory database 132 and obtains the clothing accessory description file corresponding to the clothing accessory model included in the clothing accessory picture. Here, the size of the clothing accessory picture is smaller than the size of the human body picture.

Then, at Step S315, the processing unit 110 automatically superposes the clothing accessory picture on the human body picture based on the human body description file and the clothing accessory description file. More specifically, the processing unit 110 automatically superposes the clothing accessory picture on the human body picture based on the human body coordinate matrix and the clothing accessory coordinate matrix and shows the superposed pictures on the display unit 120. Here, the background of the clothing accessory picture is transparent, so when superposing the clothing accessory picture on the human body picture, the background of the clothing accessory picture does not block a part of the human body model.

The processing unit 110 is also capable of determining whether a new clothing accessory picture (including a new clothing accessory model) was obtained from clothing accessory database 132 by the user. If the user chooses the new clothing accessory picture from clothing accessory database 132, step S315 is repeated. If no new clothing accessory picture is obtained, the processing unit 110 may then generate a superposed picture based on an outcome of superposition, and store the superposed picture in the completed collocation database 133.

After automatically superposing the clothing accessory picture on the human body picture, the clothing accessory picture may be automatically rotated and corrected based on the human body description file and the clothing accessory description file. For example, the human body description file includes the angle information of the human body description file. The angle information of the human body description file records the angles between the axes in the human body model. The clothing accessory description file also includes the second angle information of the clothing accessory description file. The second angle information of the clothing accessory description file records the angles between the axes in the clothing accessory model. Based on the angle information of the human body description file and the angle information of the clothing accessory description file, processing unit 110 automatically rotates and corrects the clothing accessory picture.

Furthermore, the processing unit 110 may make a further comparison as to whether a clothing accessory size of the clothing accessory model matches a body size of the human body model. For example, the human body picture also has a corresponding human body information file, and at least one body size such as neck perimeter, shoulder width, chest perimeter, waist perimeter, buttocks perimeter, arm perimeter, thigh perimeter, calf perimeter, or wrist perimeter is recorded in the human body information file. Similarly, each clothing accessory picture also has a corresponding clothing accessory information file. In the clothing accessory information file, at least one clothing accessory size such as shoulder width, chest width, sleeve length, clothes length, bottom opening width, sleeve opening width, waist width, buttocks width, trouser length, or leg width is recorded.

In addition, corresponding type of material is recorded in the clothing accessory information file as well. When the recorded the type of the material is flexible and the clothing accessory size is smaller than the body size, the processing unit 110 may enlarge the clothing accessory picture within a flexible size range of the type of the material to match the body size with the clothing accessory size. However, if the clothing accessory size is significantly smaller than the flexible size range, the processing unit 110 may show a message on display unit 120 to inform the user that the clothing accessory picture that the user chose does not match the human body picture. On the other hand, when the recorded type of the material is rigid and the clothing accessory size is smaller than the body size, the processing unit 110 may also show a message on display unit 120 that the clothing accessory picture that the user chose does not match the human body picture.

Moreover, in the clothing accessory information file, the clothing accessory category is also recorded for the processing unit 110 to identify and perform subsequent processes.

In the following, clothing accessory pictures in different clothing accessory categories are exemplified to describe the step of superposing the clothing accessory picture on the human body picture.

Figure 4:
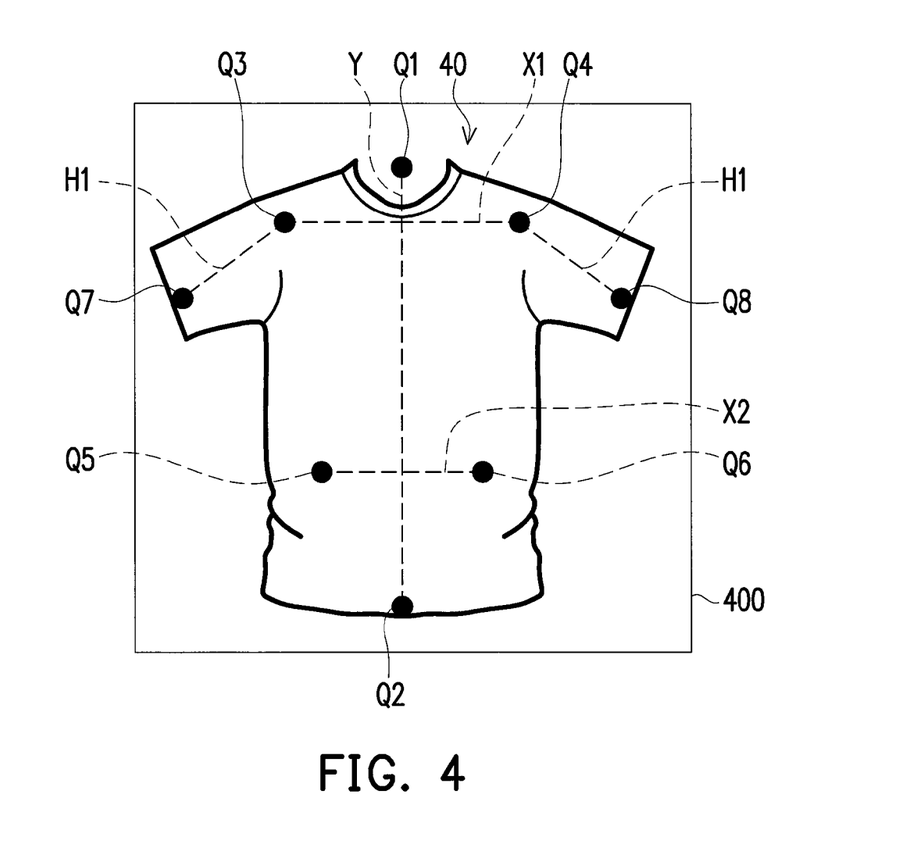
FIG. 4 is a schematic view illustrating a clothing accessory picture according to an embodiment of the invention.
Figure 5:
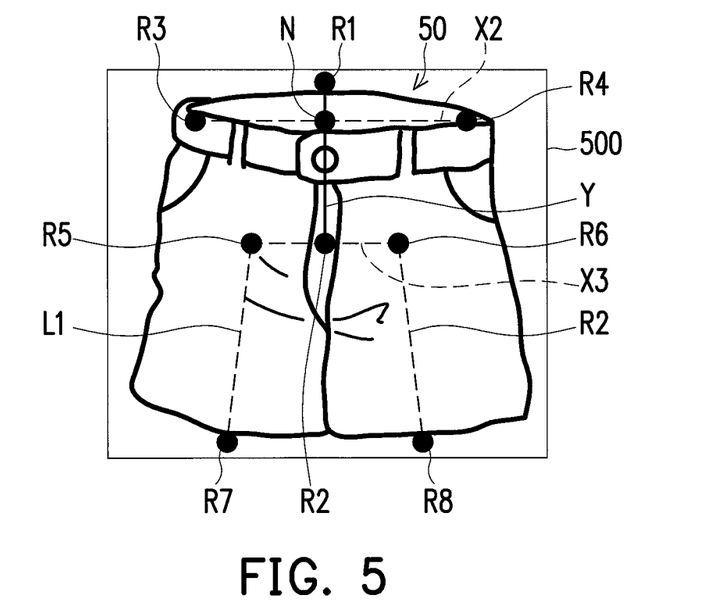
FIG. 5 is a schematic view illustrating another clothing accessory picture according to an embodiment of the invention.

For example, FIG. 4 is a schematic view illustrating a clothing accessory picture according to an embodiment of the invention. FIG. 5 is a schematic view illustrating another clothing accessory picture according to an embodiment of the invention. In FIG. 4, the corresponding clothing accessory category for clothing accessory model 40 of clothing accessory picture 400 is an upper body accessory (top wear). In FIG. 5, the corresponding clothing accessory category for clothing accessory model 50 of clothing accessory picture 500 is a lower body accessory (pants).

In the following, a description is provided with reference to the human body model 20 shown in FIG. 2. Moreover, it is set herein that the human body model 20 shown in FIG. 2 has a human body coordinate matrix HB {Y, X1, X2, X3, H1, H2, H3, H4, L1, L2, L3, L4}, and coordinates of each of the axes are respectively represented as follows:

Y: {P1(x1, y1) . . . P2(x2, y2)};
X1: {P3(x3, y3) . . . P4(x4, y4)};
X2: {P5(x5, y5) . . . P6(x6, y6)};
X3: {P7(x7, y7) . . . P8(x8, y8)};
H1: {P3(x3, y3) . . . P9(x9, y9)};
H2: {P4(x4, y4) . . . P10(x10, y10)};
H3: {P9(x9, y9) . . . P11(x11, y11)};
H4: {P10(x10, y10) . . . P12(x12, y12)};
L1: {P7(x7, y7) . . . P13(x13, y13)};
L2: {P8(x8, y8) . . . P14(x14, y14)};
L3: {P13(x13, y13) . . . P15(x15, y15)};
L4: {P14(x14, y14) . . . P16(x16, y16)}.

In addition, referring to FIG. 4, it is set herein that a clothing accessory coordinate matrix T1 of the clothing accessory model 40 is {Y, X1, X2, X3, H1, H2, H3, H4, L1, L2, L3, L4}, and coordinates of each of the axes are respectively represented as follows:

Y: {Q1(u1, v1) . . . Q2(u2, v2)};
X1: {Q3(u3, v3) . . . Q4(u4, v4)};
X2: {Q5(u5, v5) . . . Q6(u6, v6)};
X3: {(0, 0) . . . (0, 0)};
H1: {Q3(u3, v3) . . . Q7(u7, v7)};
H2: {Q4(u4, v4) . . . Q8(u8, v8)};
H3: {(0, 0) . . . (0, 0)};
H4: {(0, 0) . . . (0, 0)};
L1: {(0, 0) . . . (0, 0)};
L2: {(0, 0) . . . (0, 0)};
L3: {(0, 0) . . . (0, 0)};
L4: {(0, 0) . . . (0, 0)}.

Since the clothing accessory category of the clothing accessory model 40 is upper body accessory, the values of the right thigh axis L1, the left thigh axis L2, the right calf axis L3, and the left calf axis L4 are set to zero. Moreover, since the clothing accessory model 40 is a short-sleeve top wear, the values of the buttocks axis X3, the right lower arm axis H3, and the left lower arm axis H4 are also set to zero.

Here for example, when superposing the clothing accessory picture 400 on the human body picture 200, the processing unit 100 uses the spine axis Y of the human body coordinate matrix HB and the spine axis Y of the clothing accessory coordinate matrix T1 as reference for lateral superposition. For example, y1 in the control point P1 on the spine axis Y of the human body coordinate matrix HB and v1 in the corresponding control point Q1 on the spine axis Y of the clothing accessory coordinate matrix T1 are used as a vertical reference for superposing downward. Then, the processing unit 110 performs rotation and correction automatically based on the included angle θ1 between the spine axis Y and the shoulder axis X1 of the human body coordinate matrix HB and an angle between the spine Y and the shoulder axis X1 of the clothing accessory coordinate matrix T1.

Besides, referring to FIG. 5, it is set herein that a clothing accessory coordinate matrix T2 of the clothing accessory model 50 is {Y, X1, X2, X3, H1, H2, H3, H4, L1, L2, L3, L4}, and coordinates of each of the axes are respectively represented as follows:

Y: {R1(u1', v1') . . . R2(u2', v2')};
X2: {R3(u3', v3') . . . R4(u4', v4')};
X3: {R5(u5', v5') . . . R6(u6', v6')};
H1: {(0, 0) . . . (0, 0)};
H2: {(0, 0) . . . (0, 0)};
H3: {(0, 0) . . . (0, 0)};
H4: {(0, 0) . . . (0, 0)};
L1: {R5(u5', v5') . . . R7(u7', v7')};
L2: {R6(u6', v6') . . . R8(u8', v8')};
L3: {(0, 0) . . . (0, 0)};
L4: {(0, 0) . . . (0, 0)}.

Since the clothing accessory 50 is categorized as a lower body accessory, values of the right upper arm axis H1, the left upper arm axis H2, the right lower arm axis H3, and the left lower arm axis H4 are set to zero. Also, since the clothing accessory model 50 is a pair of shorts, values of the right calf axis L3 and the left calf axis L4 are also set to zero.

For example, when the clothing accessory picture 500 is superposed on the human body picture 200, the processing unit 110 uses the control point N1 where the spin axis Y and the waist axis X2 intersect in the human body coordinate matrix HB and the control point N where the spine axis Y and the waist axis X2 in the clothing accessory coordinate matrix T2 as a vertical reference for superposing downward. Then, the processing unit 110 compares the included angle θ8 between the buttocks axis X3 and the right thigh axis L1 in the human body coordinate matrix HB with an included angle between the buttocks axis X3 and the right thigh axis L1 in the clothing accessory coordinate matrix T2, thereby automatically rotating and correcting the clothing accessory picture 50. Alternatively, the processing unit 110 compares the included angle θ9 between the buttocks axis X3 and the left thigh axis L2 in the human body coordinate matrix HB with an included angle between the buttocks axis X3 and the left thigh axis L2 in the clothing accessory coordinate matrix T2, thereby automatically rotating and correcting the clothing accessory picture 50.

Moreover, values of the vertical coordinates x2 and y2 of the waist axis X2 in the clothing accessory coordinate matrix T2 of the clothing accessory model 50 may be adjusted in accordance with a high waist or a low waist design. For example, for the low waist design, the values may be set to negative or zero, and a control point (i.e. control point R2) where the buttocks axis X3 and the spine axis Y intersect may alternatively serve as a vertical reference to extend upward and downward for superposition.

Here, an operating interface may be further provided in the display unit 120, such that the user is allowed to complete collocating the clothing accessory on the human body through the operating interface. For example, the processing unit 110 may import a human body picture from the human body database 131 to the operating interface based on the user's request, thereby displaying the human body picture. Then, the user may choose a clothing accessory picture from the clothing accessory database 132 through the operating interface. For example, the operating interface provides a clothing accessory list for the user to choose from. After a choice is made, the processing unit 110 may input the chosen clothing accessory picture from the clothing accessory database 132 to the operating interface.

The user may also add a new human body picture or a new clothing accessory picture. When the processing unit 110 receives a new human body picture (or a new clothing accessory picture), a human body coordinate matrix of the new human body picture (or a clothing accessory coordinate matrix of the new clothing accessory picture) may be obtained by adjusting a human body coordinate matrix already existing in the human body database 131 (or a clothing accessory coordinate matrix already existing in the clothing accessory database 132).

For example, regarding adding a new human body picture, the processing unit 110 may obtain a human body coordinate matrix corresponding to one of the existing human body pictures from the human body database 131 and display a plurality of control points included in the human body coordinate matrix on the new human body picture for the user to adjust, thereby obtaining a human body coordinate matrix corresponding to the new human body picture. Similarly, regarding adding a new clothing accessory picture, the processing unit 110 may obtain a clothing accessory coordinate matrix corresponding to one of the existing clothing accessory pictures from the clothing accessory database 132 and display a plurality of control points included in the clothing accessory coordinate matrix on the new clothing accessory picture for the user to adjust, thereby obtaining a clothing accessory coordinate matrix corresponding to the new clothing accessory picture.

Meanwhile, when superposing two pictures, there are circumstances where operations such as translating, zooming in, zooming out, rotating, or transforming need to be performed to coordinates of the pictures. For example, when positions of reference points are different, the translating operation is performed. For example, $x=u+Tx$, and $y=v+Ty$, wherein Tx and Ty are respectively translation in pixels on X and Y axes. When the reference points have different distances, the zoom-in or zoom-out operation is performed. For example, $x=u \times Sx$ and $y=u \times Sy$, wherein Sx and Sy are respectively multiples to zoom in or out on X and Y axes. When reference angles are inconsistent, a rotating operation is performed. For example, $x=u \times \cos\theta - v - \sin\theta$, and $y=u \times \sin\theta + v \times \cos\theta$, wherein $\theta$ is a rotating angle.

In view of the foregoing, the description file is built for the human body model, and a description file is built for each of the clothing accessory model. Accordingly, the electronic apparatus is capable of automatically collocating the clothing accessory based on the description files. In other words, by using the image processing technology, the clothing or accessory may be correctly aligned to the human body when being applied, and the clothing accessory picture may be automatically rotated and corrected so as to significantly improve the convenience in use. In addition, by previewing the collocation such as matching colors of clothes on the display unit, the time actually spent on wearing and changing clothes multiple times is reduced. Moreover, by building the respective description files for the human body model and the clothing accessory model, the clothing accessory picture need not to be the same size as that of the human body picture. Thus, the size of the clothing accessory picture is no longer confined. In other words, the size of the clothing accessory picture may be reduced to save storage space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for collocating a clothing accessory on a human body, adapted for an electronic apparatus, the method comprising:

showing a human body picture on a display unit, and obtaining a human body description file corresponding to a human body model comprised in the human body picture from a first database, wherein the human body description file comprises a human body coordinate matrix based on a plurality of axes;

based on a user choice, obtaining a clothing accessory picture from a second database, and obtaining a clothing accessory description file corresponding to a clothing accessory model comprised in the clothing accessory picture, wherein the clothing accessory description file comprises a clothing accessory coordinate matrix based on the axes; and based on the human body coordinate matrix and the clothing accessory coordinate matrix, automatically superposing the clothing accessory picture on the human body picture, rotating and correcting the clothing accessory picture based on angle information of the human body description file and angle information of the clothing accessory description file, wherein the angle information of the human body description file records angles between the axes of the human body model, and the angle information of the clothing accessory description file records angles between the axes of the clothing accessory model, and showing the superposed pictures on the display unit, wherein the axes of the human body comprising a spine axis, a shoulder axis, a waist axis, a buttocks axis, a right upper arm axis, a left upper arm axis, a right lower arm axis, a left lower arm axis, a right thigh axis, a left thigh axis, a right calf axis, and a left calf axis.

2. The method as claimed in claim 1, wherein after automatically superposing the clothing accessory picture on the human body picture, the method further comprises:

adjusting a size of the clothing accessory picture based on the human body coordinate matrix and the clothing accessory coordinate matrix.

3. The method as claimed in claim 1, wherein the clothing accessory picture has a corresponding clothing accessory information file, and the clothing accessory information file comprises a type of material, and before automatically superposing the clothing accessory picture on the human body picture, the method further comprises:

making a comparison as to whether a clothing accessory size of the clothing accessory model matches a body size of the human body model; and under a circumstance that the type of the material is flexible, if the clothing accessory size is smaller than the body size, enlarging the clothing accessory picture within a flexible size range of the type of the material to match the body size with the clothing accessory size.

4. The method as claimed in claim 1, wherein the axes comprise a spine axis, a shoulder axis, a waist axis, a buttocks axis, upper arm axes, lower arm axes, thigh axes, and calf axes.

5. The method as claimed in claim 1, further comprising:
building the human body description file in advance, comprising:
  receiving the human body picture having the human body model;
  building the axes of the human body model; and
  obtaining the human body coordinate matrix based on the axes; and
storing the human body description file in the first database.

6. The method as claimed in claim 1, further comprising:
building the clothing accessory description file in advance, comprising:
  receiving the clothing accessory picture having the clothing accessory model;
  building the axes of the clothing accessory model; and
  obtaining the clothing accessory coordinate matrix based on the axes; and
storing the clothing accessory description file in the second database.

7. The method as claimed in claim 1, wherein after automatically superposing the clothing accessory picture on the human body picture, the method further comprises:
  determining whether a new clothing accessory picture has been obtained from the second database, wherein the new clothing accessory picture comprises another clothing accessory model; and
  if the new clothing accessory picture was obtained from the second database, automatically superposing the new clothing accessory picture on the human body picture according to the human body coordinate matrix and a clothing accessory coordinate matrix of the new clothing accessory picture, and displaying the superposed pictures on the display unit.

8. The method as claimed in claim 7, wherein after determining whether another clothing accessory picture was obtained from the second database, the method further comprises:
  if the new clothing accessory picture was not obtained from the second database, generating and storing a superposed picture.

9. The method as claimed in claim 1, further comprising:
when receiving a new human body picture, obtaining a human body coordinate matrix corresponding to the new human body picture by adjusting an existing human body coordinate matrix in the first database; and
when receiving a new clothing accessory picture, obtaining a clothing accessory coordinate matrix corresponding to the new clothing accessory picture by adjusting an existing clothing accessory coordinate matrix in the second database.

10. The method as claimed in claim 1, further comprising:
providing an operating interface in the display unit;
importing the human body picture to the operating interface to display the human body picture;
choosing the clothing accessory picture from the second database through the operating interface; and
after automatically superposing the clothing accessory picture on the human body picture, displaying an outcome of superposition through the operating interface.

\* \* \* \* \*